(12) United States Patent
Uno

(10) Patent No.: US 12,049,234 B2
(45) Date of Patent: Jul. 30, 2024

(54) DRIVING ASSISTANCE SYSTEM, DRIVING ASSISTANCE METHOD, AND STORAGE MEDIUM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 17/886,902

(22) Filed: Aug. 12, 2022

(65) Prior Publication Data

US 2023/0094320 A1 Mar. 30, 2023

(30) Foreign Application Priority Data

Sep. 30, 2021 (JP) .................................. 2021-161622

(51) Int. Cl.
*B60W 50/14* (2020.01)
*B60W 30/095* (2012.01)
*B60W 40/04* (2006.01)
*B60W 50/10* (2012.01)
*B60W 50/00* (2006.01)

(52) U.S. Cl.
CPC ........ *B60W 50/14* (2013.01); *B60W 30/0956* (2013.01); *B60W 40/04* (2013.01); *B60W 50/10* (2013.01); *B60W 2050/0083* (2013.01); *B60W 2050/143* (2013.01); *B60W 2050/146* (2013.01); *B60W 2556/20* (2020.02)

(58) Field of Classification Search
CPC .. B60W 50/14; B60W 30/0956; B60W 40/04; B60W 50/10; B60W 2556/20; B60W 2050/0083; B60W 2050/143; B60W 2050/146
See application file for complete search history.

(56) References Cited

U.S. PATENT DOCUMENTS

| 2012/0083964 A1* | 4/2012 | Montemerlo | ........... B60T 8/885 |
| | | | 701/25 |
| 2018/0173224 A1* | 6/2018 | Kim | ...................... G05D 1/0061 |
| 2018/0244286 A1* | 8/2018 | Sakai | .................. G02B 27/0179 |

(Continued)

FOREIGN PATENT DOCUMENTS

| JP | 2004-017710 A | 1/2004 |
| JP | 2009-146254 A | 7/2009 |

(Continued)

*Primary Examiner* — Sisay Yacob
(74) *Attorney, Agent, or Firm* — Dinsmore & Shohl LLP

(57) ABSTRACT

A driving assistance system includes an assistance information acquisition unit configured to acquire assistance information from an information processing server, a setting information acquisition unit configured to acquire an assistance timing of an in-vehicle driving assistance unit set by a driver of a target vehicle, and an assistance information providing unit configured to execute driving assistance for the target vehicle based on the acquired assistance information. The assistance information providing unit provides the driving assistance based on the assistance information when the assistance timing is within a first timing range and does not execute the driving assistance based on the assistance information when the assistance timing is within a second timing range later than the first timing range.

7 Claims, 8 Drawing Sheets

(56) References Cited

U.S. PATENT DOCUMENTS

| | | | | |
|---|---|---|---|---|
| 2022/0306151 A1* | 9/2022 | Fukutaka | ............... | B60K 35/22 |
| 2023/0373526 A1* | 11/2023 | Shimotani | ............. | B60W 50/14 |
| 2023/0406341 A1* | 12/2023 | Satre | ........................ | G08G 1/16 |

FOREIGN PATENT DOCUMENTS

| | | | |
|---|---|---|---|
| JP | 2014-095987 A | 5/2014 | |
| JP | 2014-219814 A | 11/2014 | |
| JP | 2019-175077 A | 10/2019 | |

* cited by examiner

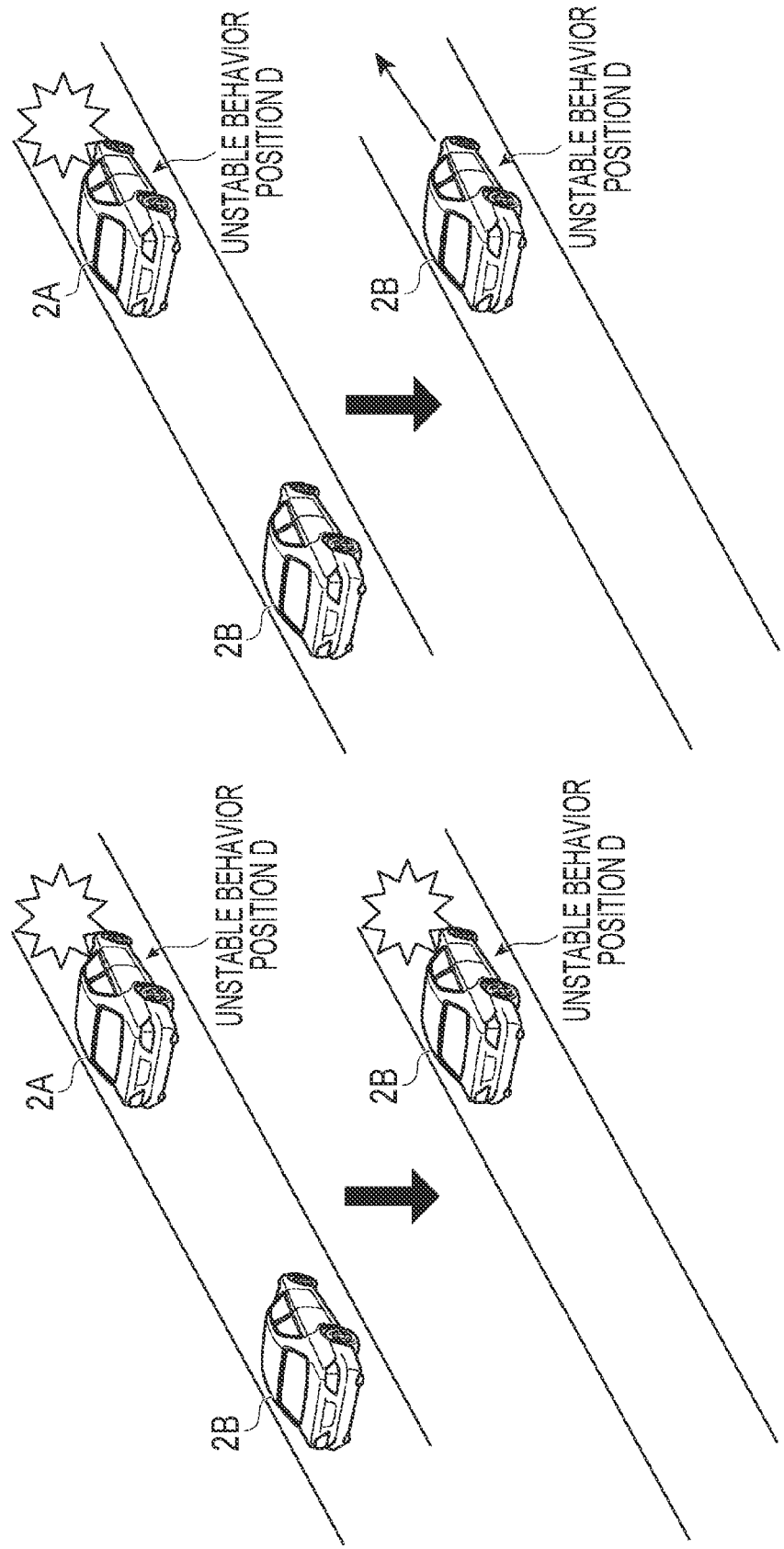

| FOLLOWING TARGET VEHICLE \ PRECEDING TARGET VEHICLE | WITH UNSTABLE BEHAVIOR | WITHOUT UNSTABLE BEHAVIOR |
|---|---|---|
| WITH UNSTABLE BEHAVIOR | SCENE 1 | SCENE 3 |
| WITHOUT UNSTABLE BEHAVIOR | SCENE 2 | SCENE 4 |

DRIVING ASSISTANCE SYSTEM, DRIVING ASSISTANCE METHOD, AND STORAGE MEDIUM

CROSS-REFERENCE TO RELATED APPLICATION

This application claims priority to Japanese Patent Application No. 2021-161622 filed on Sep. 30, 2021, incorporated herein by reference in its entirety.

BACKGROUND

1. Technical Field

The present disclosure relates to a driving assistance system, a driving assistance method, and a storage medium.

2. Description of Related Art

For example, Japanese Unexamined Patent Application Publication No. 2009-146254 (JP 2009-146254 A) describes that a server device calculates risk level information according to a probability that a road is in a dangerous state and transmits the risk level information to a warning device mounted on a vehicle. The warning device of the vehicle that has received the risk level information outputs a warning to a driver in the vehicle according to the received risk level information.

SUMMARY

When the warning is issued to the driver of the vehicle, a degree of acceptance of the warning differs for each driver. For example, some drivers want to be proactively warned, while others consider the warning annoying. In this manner, when driving assistance such as the warning is provided for the driver of the vehicle, a driver's intention is requested to be considered.

Therefore, the present disclosure describes a driving assistance system, a driving assistance method, and a storage medium capable of providing driving assistance in consideration of a driver's intention when the driving assistance for a vehicle is provided based on assistance information generated by an assistance information generation device.

One aspect of the present disclosure relates to a driving assistance system that provides driving assistance for a vehicle equipped with an in-vehicle driving assistance device based on assistance information generated by an assistance information generation device. The system includes an assistance information acquisition unit configured to acquire the assistance information from the assistance information generation device, a setting information acquisition unit configured to acquire an assistance timing of the in-vehicle driving assistance device set by a driver of the vehicle, and a driving assistance unit configured to execute the driving assistance for the vehicle based on the acquired assistance information. The driving assistance unit provides the driving assistance for the vehicle based on the acquired assistance information when the assistance timing is within a first timing range and does not execute the driving assistance for the vehicle based on the acquired assistance information when the assistance timing is within a second timing range later than the first timing range.

In this driving assistance system, the driving assistance based on the assistance information generated by the assistance information generation device is provided based on the assistance timing of the in-vehicle driving assistance device set by the driver. The case where the assistance timing set by the driver is late is considered to be a case where the driver does not want active driving assistance. Therefore, in this driving assistance system, the driving assistance based on the assistance information is not provided when the assistance timing is late (when the assistance timing is within the second timing range). That is, this driving assistance system can read the driver's intention for the driving assistance based on the assistance timing of the in-vehicle driving assistance device set by the driver. Accordingly, this driving assistance system can provide the driving assistance in consideration of the driver's intention.

In the driving assistance system, the in-vehicle driving assistance device may provide collision avoidance assistance and issue a warning when the vehicle approaches a front vehicle as the collision avoidance assistance. The assistance timing may be an output timing of the warning issued by the in-vehicle driving assistance device. The assistance information acquired by the assistance information acquisition unit may be information related to the collision avoidance assistance. The driving assistance unit may issue, when the driving assistance based on the assistance information is provided, a warning based on the assistance information before the warning by the in-vehicle driving assistance device. In this case, the driving assistance system can issue the warning based on the assistance information at an early stage according to the driver's intention before the collision avoidance warning by the in-vehicle driving assistance device.

In the driving assistance system, the assistance information acquisition unit may acquire reliability of the assistance information together with the assistance information from the assistance information generation device. The driving assistance unit may execute, when the acquired reliability of the assistance information is higher than a predetermined reliability threshold value, the driving assistance based on the assistance information even though the assistance timing is in the second timing range. In this case, the driving assistance system can execute the driving assistance based on the assistance information regardless of the driver's intention when the reliability of the assistance information is high.

Another aspect of the present disclosure relates to a driving assistance method of providing driving assistance for a vehicle equipped with an in-vehicle driving assistance device based on assistance information generated by an assistance information generation device. The method includes an assistance information acquisition step of acquiring the assistance information from the assistance information generation device, a setting information acquisition step of acquiring an assistance timing of the in-vehicle driving assistance device set by a driver of the vehicle, and a driving assistance step of executing the driving assistance for the vehicle based on the acquired assistance information. In the driving assistance step, the driving assistance for the vehicle is provided based on the acquired assistance information when the assistance timing is within a first timing range and the driving assistance for the vehicle based on the acquired assistance information is not executed when the assistance timing is within a second timing range later than the first timing range.

In this driving assistance method, the driving assistance based on the assistance information generated by the assistance information generation device is provided based on the assistance timing of the in-vehicle driving assistance device set by the driver. The case where the assistance timing set by the driver is late is considered to be a case where the driver does not want active driving assistance. Therefore, in this driving assistance method, the driving assistance based on the assistance information is not provided when the assistance timing is late (when the assistance timing is within the second timing range). That is, in this driving assistance method, the driver's intention for driving assistance can be read based on the assistance timing of the in-vehicle driving assistance device set by the driver. Accordingly, this driving assistance method can provide the driving assistance in consideration of the driver's intention.

Still another aspect of the present disclosure relates to a storage medium storing a driving assistance program that operates a driving assistance ECU of a driving assistance system that provides driving assistance for a vehicle equipped with an in-vehicle driving assistance device based on assistance information generated by an assistance information generation device. The program causes the driving assistance ECU to operate as an assistance information acquisition unit configured to acquire the assistance information from the assistance information generation device, a setting information acquisition unit configured to acquire an assistance timing of the in-vehicle driving assistance device set by a driver of the vehicle, and a driving assistance unit configured to execute the driving assistance for the vehicle based on the acquired assistance information. In the driving assistance unit, the driving assistance for the vehicle is provided based on the acquired assistance information when the assistance timing is within a first timing range and the driving assistance for the vehicle based on the acquired assistance information is not executed when the assistance timing is within a second timing range later than the first timing range.

In this driving assistance program, the driving assistance based on the assistance information generated by the assistance information generation device is provided based on the assistance timing of the in-vehicle driving assistance device set by the driver. The case where the assistance timing set by the driver is late is considered to be a case where the driver does not want active driving assistance. Therefore, in this driving assistance program, the driving assistance based on the assistance information is not provided when the assistance timing is late (when the assistance timing is within the second timing range). That is, in this driving assistance program, the driver's intention for the driving assistance can be read based on the assistance timing of the in-vehicle driving assistance device set by the driver. Accordingly, this driving assistance program can provide the driving assistance in consideration of the driver's intention.

In the driving assistance program, the in-vehicle driving assistance device may provide collision avoidance assistance and issue a warning when the vehicle approaches a front vehicle as the collision avoidance assistance. The assistance timing may be an output timing of the warning issued by the in-vehicle driving assistance device. The assistance information acquired by the assistance information acquisition unit may be information related to the collision avoidance assistance. The driving assistance unit may issue, when the driving assistance based on the assistance information is provided, a warning based on the assistance information before the warning by the in-vehicle driving assistance device. In this case, in the driving assistance program, the warning based on the assistance information can be issued at an early stage according to the driver's intention before the warning of collision avoidance by the in-vehicle driving assistance device.

In the driving assistance program, the assistance information acquisition unit may acquire reliability of the assistance information together with the assistance information from the assistance information generation device. The driving assistance unit may execute, when the acquired reliability of the assistance information is higher than a predetermined reliability threshold value, the driving assistance based on the assistance information even though the assistance timing is in the second timing range. In this case, in the driving assistance program, the driving assistance based on the assistance information can be executed regardless of the driver's intention when the reliability of the assistance information is high.

According to various aspects of the present disclosure, when the driving assistance for the vehicle is provided based on the assistance information generated by the assistance information generation device, the driving assistance in consideration of the driver's intention can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a diagram for describing an example of a continuous occurrence situation;

FIG. 5B is a diagram for describing an example of a discontinuous situation;

DETAILED DESCRIPTION OF EMBODIMENTS

Figure 1:
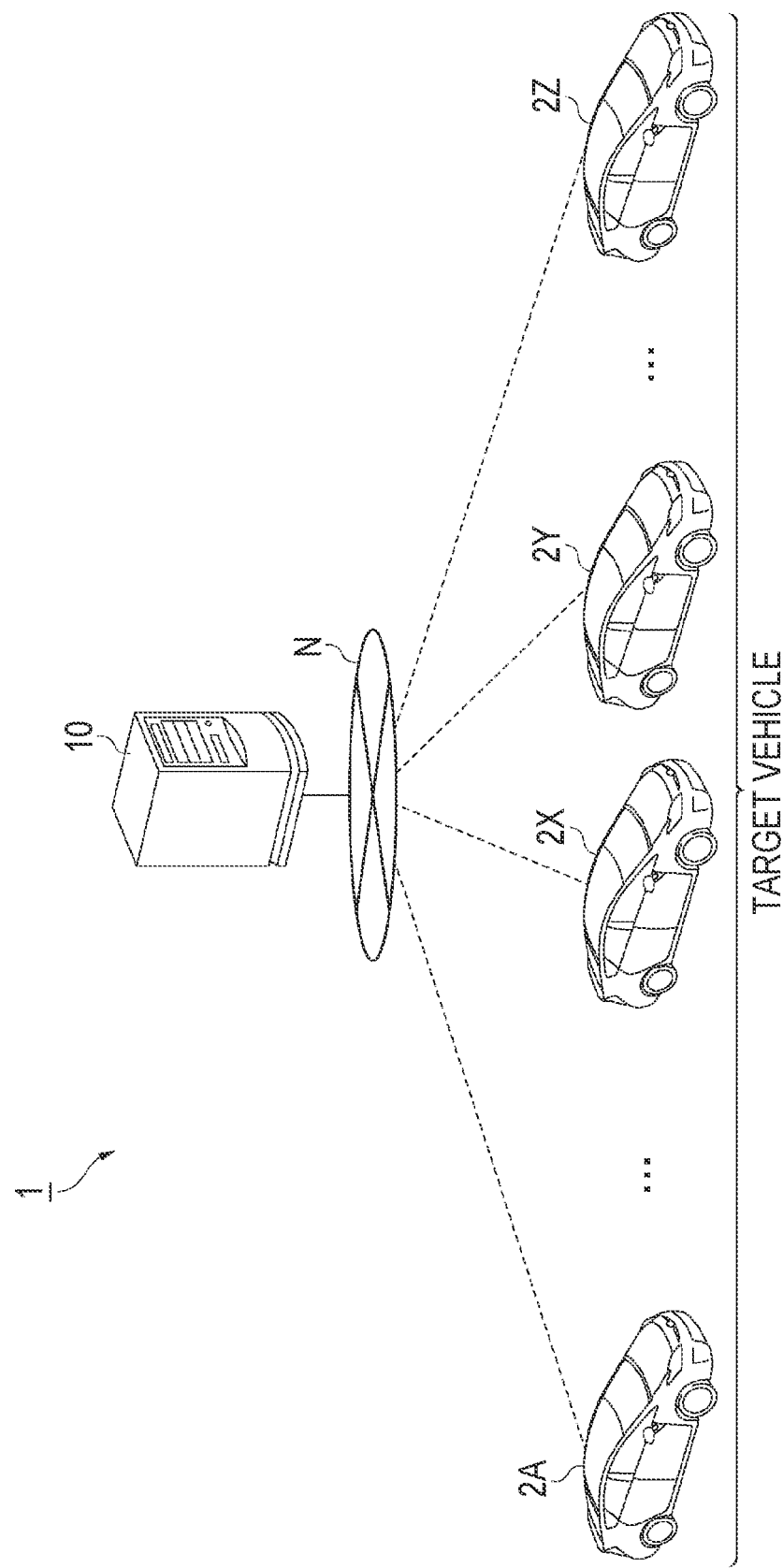
FIG. 1 is a diagram showing a driving assistance system according to an embodiment.

Hereinafter, exemplary embodiments will be described with reference to the drawings. In each figure, the same reference numeral is assigned to the same or corresponding element, and duplicate description will be omitted.

FIG. 1 is a diagram showing a driving assistance system 1 according to an embodiment. As shown in FIG. 1, the driving assistance system 1 includes an information processing server (assistance information generation device) 10 and a plurality of target vehicles (vehicles) 2. The information processing server 10 is communicably connected to the target vehicle 2 (2A to 2Z) via a network N. The network N is a wireless communication network. The target vehicle 2 means a vehicle for which the information processing server 10 collects information. The target vehicle 2 includes a vehicle to be assisted to which various types of assistance are provided from the information processing server 10. When the target vehicles 2 are described individually, the target vehicles 2A to 2Z are used. Further, the driving assistance system 1 provides driving assistance to the target vehicle 2 based on assistance information generated by the information processing server 10.

Figure 2:
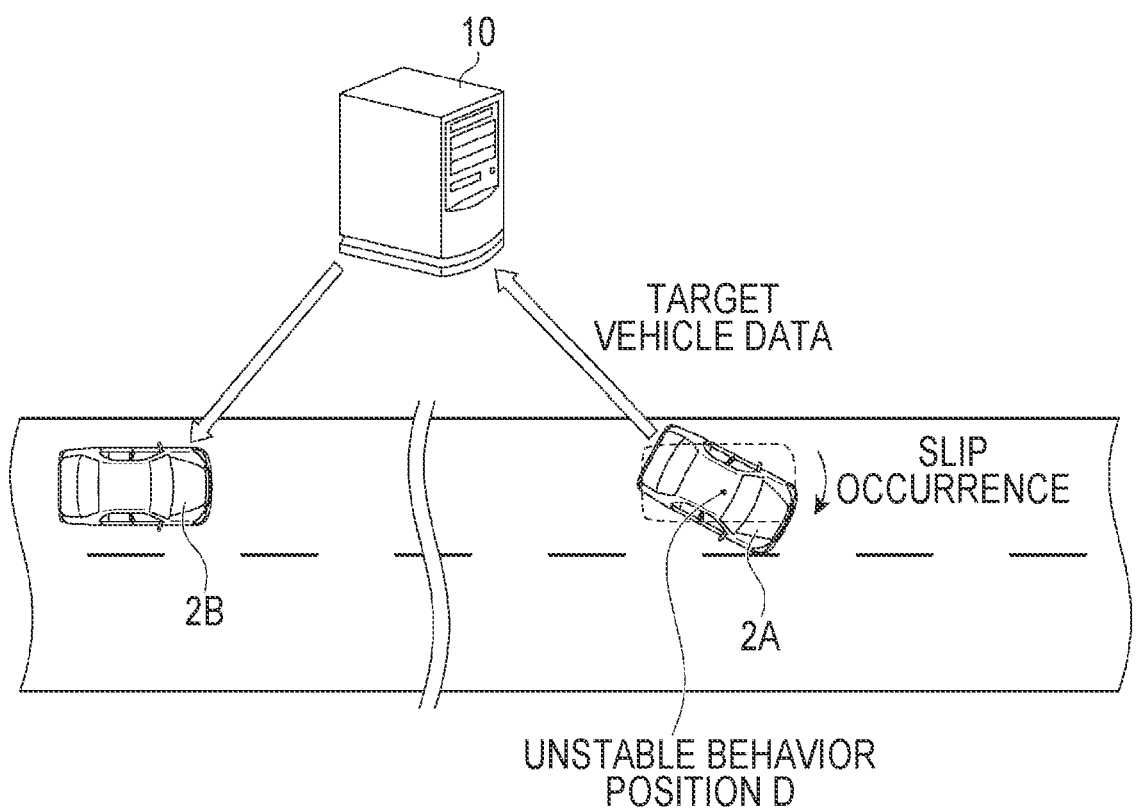
FIG. 2 is a diagram for describing an example of information processing.

FIG. 2 is a diagram for describing an example of information processing.

As shown in FIG. 2, behavior of the target vehicle 2A may become unstable, for example, a slip of the target vehicle 2A due to road surface freezing. The target vehicle 2A transmits target vehicle data including an unstable behavior position D, which is a position where the slip occurs, to the information processing server 10. The information processing server 10 transmits vehicle assistance information for suppressing unstable behavior of the target vehicle 2B to the target vehicle 2B traveling behind the target vehicle 2A, for example. Accordingly, it is possible to suppress the unstable behavior of the target vehicle 2B at the unstable behavior position D.

Configuration of Target Vehicle

First, a configuration of the target vehicle 2 will be described. An identification [ID] (vehicle identification number) for identifying the vehicle is assigned to the target vehicle 2. The target vehicle 2 may be one, two or more, several tens or more, or several hundred or more. The target vehicle 2 does not have to be a vehicle having the same configuration and may be a vehicle having a different vehicle type or the like. The target vehicle 2 may be an autonomous driving vehicle having an autonomous driving function or may be a vehicle having no autonomous driving function.

Figure 3:
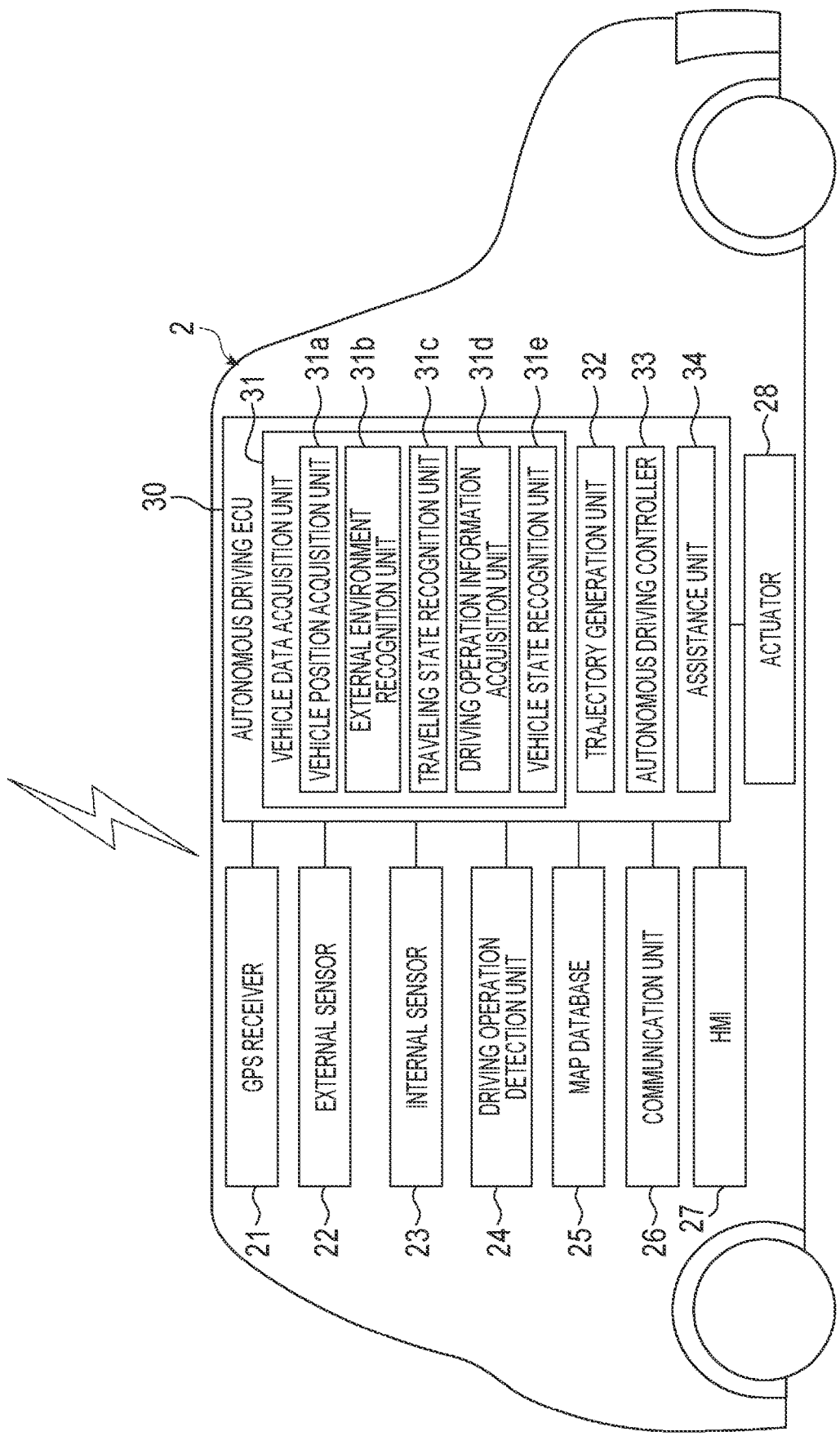
FIG. 3 is a block diagram showing an example of a configuration of a target vehicle.

Hereinafter, the target vehicle 2 will be described with reference to FIG. 3. FIG. 3 is a block diagram showing an example of the configuration of the target vehicle 2. The target vehicle 2 will be described as an autonomous driving vehicle.

As shown in FIG. 3, the target vehicle 2 includes an autonomous driving electronic control unit [ECU] 30. The autonomous driving ECU (driving assistance ECU) 30 is an electronic control unit having a CPU, a ROM, a RAM, and the like. The autonomous driving ECU 30, for example, loads a program stored in the ROM into the RAM and causes the CPU to execute the program loaded in the RAM to realize various functions. The program is an example of a storage medium. The autonomous driving ECU 30 may be configured of a plurality of electronic units.

The autonomous driving ECU 30 is connected to a global positioning system [GPS] receiver 21, an external sensor 22, an internal sensor 23, a driving operation detection unit 24, a map database 25, a communication unit 26, a human machine interface [HMI] 27, and an actuator 28.

The GPS receiver 21 receives signals from three or more GPS satellites to measure a position of the target vehicle 2 (for example, latitude and longitude of the target vehicle 2). The GPS receiver 21 transmits the measured position information of the target vehicle 2 to the autonomous driving ECU 30.

The external sensor 22 is a detector that detects an external environment of the target vehicle 2. The external sensor 22 includes at least one of a camera or a radar sensor.

The camera is an imaging device that images the external environment of the target vehicle 2. The camera is provided on a back side of a windshield of the target vehicle 2 and captures an image in front of the vehicle. The camera transmits the imaging information regarding the external environment of the target vehicle 2 to the autonomous driving ECU 30. The camera may be a monocular camera or a stereo camera.

The radar sensor is a detection device that detects an object around the target vehicle 2 by using a radio wave (for example, millimeter wave) or light. The radar sensor includes, for example, a millimeter-wave radar or light detection and ranging [LIDAR]. The radar sensor transmits the radio wave or light to the periphery of the target vehicle 2 and receives the radio wave or light reflected by the object to detect the object. The radar sensor transmits the detected object information to the autonomous driving ECU 30. The object includes moving objects, such as a pedestrian, a bicycle, and another vehicle, in addition to fixed objects, such as a guardrail and a building. The external sensor 22 may include an outside air temperature sensor that detects an outside air temperature of the target vehicle 2. The external sensor 22 may include a light sensor that detects brightness of the outside.

The internal sensor 23 is a detector that detects a state of the target vehicle 2. The internal sensor 23 includes a vehicle speed sensor, an acceleration sensor, and a yaw rate sensor as sensors that detect a traveling state of the target vehicle 2. The vehicle speed sensor is a detector that detects a speed of the target vehicle 2. As the vehicle speed sensor, wheel speed sensors provided for wheels of the target vehicle 2, a drive shaft that rotates integrally with the wheels, or the like to detect a rotation speed of each wheel may be used. The vehicle speed sensor transmits the detected vehicle speed information (wheel speed information) to the autonomous driving ECU 30.

The acceleration sensor is a detector that detects acceleration of the target vehicle 2. The acceleration sensor includes, for example, a front-rear acceleration sensor that detects the acceleration of the target vehicle 2 in a front-rear direction. The acceleration sensor may include a lateral acceleration sensor that detects lateral acceleration of the target vehicle 2. The acceleration sensor, for example, transmits the acceleration information of the target vehicle 2 to the autonomous driving ECU 30. The yaw rate sensor is a detector that detects a yaw rate (rotational angular velocity) around a vertical axis of the center of gravity of the target vehicle 2. As the yaw rate sensor, for example, a gyro sensor may be used. The yaw rate sensor transmits the detected yaw rate information of the target vehicle 2 to the autonomous driving ECU 30.

The internal sensor 23 detects at least one of a tire pressure, a wiper operation state, or a lamp state as the vehicle state of the target vehicle 2. The tire pressure is a tire pressure of the target vehicle 2. The wiper operation state may include an operation speed of the wiper, in addition to presence or absence of a wiper operation. The lamp state includes a lighting state of a direction indicator. The lamp state may include presence or absence of lighting of a headlight and presence or absence of lighting of a fog lamp.

The internal sensor 23 may detect a brake pressure of a hydraulic brake system from a brake pressure sensor or may detect an on and off state of traveling assistance, as the vehicle state of the target vehicle 2. The internal sensor 23 may detect a load state of each wheel from a wheel load sensor as the vehicle state of the target vehicle 2. In addition, the internal sensor 23 may have a failure detection unit configured to detect various failures of the target vehicle 2.

The driving operation detection unit 24 detects an operation of an operation unit of the target vehicle 2 by a driver. The driving operation detection unit 24 includes, for example, a steering sensor, an accelerator sensor, and a brake sensor. The operation unit of the target vehicle 2 is a device for the driver to input the operation to drive the vehicle. The operation unit of the target vehicle 2 includes at least one of a steering unit, an accelerator operation unit, or a brake operation unit. The steering unit is, for example, a steering wheel. The steering unit is not limited to a wheel shape and may be configured to function as a steering wheel. The accelerator operation unit is, for example, an accelerator pedal. The brake operation unit is, for example, a brake pedal. The accelerator operation unit and the brake operation unit do not necessarily have to be pedals and may be configured to allow the driver to input acceleration or deceleration. The operation unit may be an in-vehicle switch. An information terminal, such as a driver's smartphone, may function as the operation unit.

The steering sensor detects an operation amount of the steering unit by the driver. The operation amount of the steering unit includes a steering angle. The operation amount of the steering unit may include steering torque. The accelerator sensor detects the operation amount of the accelerator operation unit by the driver. The operation amount of the accelerator operation unit includes, for example, a depression amount of the accelerator pedal. The brake sensor detects the operation amount of the brake operation unit by the driver. The operation amount of the brake operation unit includes, for example, the depression amount of the brake pedal. There may be an aspect in which the brake sensor detects a master cylinder pressure of the hydraulic brake system. A depression speed may be included in the operation amount of the accelerator operation unit and the brake operation unit. The driving operation detection unit 24 transmits the operation amount information regarding the detected operation amount by the driver to the autonomous driving ECU 30.

The map database 25 is a database that stores map information. The map database 25 is formed in, for example, a storage device, such as an HDD, mounted on the target vehicle 2. The map information includes road position information, road shape information (for example, curvature information), position information on an intersection and a branch point, and the like. The map information may include traffic regulation information such as a legal speed associated with position information. The map information may include target information used for recognizing the position of the target vehicle 2 on the map. The target may include a lane dividing line, a traffic light, a guardrail, a road surface marking, and the like. The map database 25 may be configured on a server (not limited to the information processing server 10) capable of communicating with the target vehicle 2.

The communication unit 26 is a communication device that controls wireless communication with the outside of the target vehicle 2. Various pieces of information are transmitted and received via the network N. The communication unit 26 transmits various pieces of information to the information processing server 10 according to a signal from the autonomous driving ECU 30.

The HMI 27 is an interface by which information between the autonomous driving ECU 30 and the driver or a passenger is input and output. The HMI 27 includes, for example, a display, a speaker, and the like provided in a vehicle cabin. The HMI 27 outputs an image of the display and audio from the speaker according to a control signal from the autonomous driving ECU 30.

The actuator 28 is a device used to control the target vehicle 2. The actuator 28 includes at least a drive actuator, a brake actuator, and a steering actuator. The drive actuator controls an amount of air supplied to an engine (throttle opening degree) according to the control signal from the autonomous driving ECU 30 to control drive force of the target vehicle 2. When the target vehicle 2 is a hybrid electric vehicle, the control signal from the autonomous driving ECU 30 is input to a motor as a power source to control the drive force, in addition to the amount of air supplied to the engine. When the target vehicle 2 is a battery electric vehicle, the control signal from the autonomous driving ECU 30 is input to a motor as the power source to control the drive force. The motor as the power source in these cases constitutes the actuator 28.

The brake actuator controls the brake system according to the control signal from the autonomous driving ECU 30 to control braking force applied to the wheels of the target vehicle 2. As the brake system, for example, the hydraulic brake system may be used. The steering actuator controls drive of an assist motor that controls the steering torque in an electric power steering system according to the control signal from the autonomous driving ECU 30. Accordingly, the steering actuator controls the steering torque of the target vehicle 2.

Next, a functional configuration of the autonomous driving ECU 30 will be described. As shown in FIG. 3, the autonomous driving ECU 30 has a vehicle data acquisition unit 31, a trajectory generation unit 32, an autonomous driving controller 33, and an assistance unit 34. There may be an aspect in which some functions of the autonomous driving ECU 30 described below are executed on a server (not limited to the information processing server 10) capable of communicating with the target vehicle 2.

The vehicle data acquisition unit 31 acquires target vehicle data, which is data related to the target vehicle 2. The target vehicle data includes the position information of the target vehicle 2 on the map and the traveling state of the target vehicle 2. The target vehicle data may include the external environment of the target vehicle 2 or may include a route on which the target vehicle 2 travels. The target vehicle data may include driving operation information by the driver of the target vehicle 2 and the vehicle state of the target vehicle 2. The vehicle data acquisition unit 31 transmits the acquired target vehicle data to the information processing server 10.

The vehicle data acquisition unit 31 has a vehicle position acquisition unit 31a, an external environment recognition unit 31b, a traveling state recognition unit 31c, a driving operation information acquisition unit 31d, and a vehicle state recognition unit 31e.

The vehicle position acquisition unit 31a acquires the position information of the target vehicle 2 on the map based on the position information of the GPS receiver 21 and the map information of the map database 25. Further, the vehicle position acquisition unit 31a may acquire the position information of the target vehicle 2 by a simultaneous localization and mapping [SLAM] technique by using the target information included in the map information of the map database 25 and the detection result of the external sensor 22. The vehicle position acquisition unit 31a may recognize a lateral position of the target vehicle 2 with respect to the lane (position of the target vehicle 2 in a lane width direction) from a positional relationship between the lane dividing line and the target vehicle 2 and include the recognized position in the position information. The vehicle position acquisition unit 31a may acquire the position information of the target vehicle 2 on the map by another well-known method.

The external environment recognition unit 31b recognizes the external environment of the target vehicle 2 based on the detection result of the external sensor 22. The external environment includes a relative position of a surrounding object with respect to the target vehicle 2. The external environment may include a relative speed and movement direction of the surrounding object with respect to the target vehicle 2. The external environment may include object types such as another vehicle, a pedestrian, and a bicycle. The object types can be identified by a well-known method such as pattern matching. The external environment may include a result of dividing line recognition (white line recognition) around the target vehicle 2. The external environment may include an outside air temperature or may include weather.

The traveling state recognition unit 31*c* recognizes the traveling state of the target vehicle 2 based on the detection result of the internal sensor 23. The traveling state includes a vehicle speed of the target vehicle 2 and the yaw rate of the target vehicle 2. The traveling state may include the acceleration of the target vehicle 2. Specifically, the traveling state recognition unit 31*c* recognizes the vehicle speed of the target vehicle 2 based on the vehicle speed information of the vehicle speed sensor. The traveling state recognition unit 31*c* recognizes the acceleration of the target vehicle 2 based on the vehicle speed information of the acceleration sensor. The traveling state recognition unit 31*c* recognizes an orientation of the target vehicle 2 based on the yaw rate information of the yaw rate sensor.

The driving operation information acquisition unit 31*d* acquires the driving operation information of the target vehicle 2 based on the detection result of the driving operation detection unit 24. The driving operation information includes, for example, at least one of a driver's accelerator operation amount, brake operation amount, or steering amount.

When the target vehicle 2 has a personal authentication function, the driving operation information acquisition unit 31*d* stores a driving operation history for each driver who has personally authenticated. The driving operation history may be associated with the external environment and traveling state of the target vehicle 2. The autonomous driving ECU 30 does not necessarily have to have the driving operation information acquisition unit 31*d*. In this case, the driving operation detection unit 24 is also unnecessary.

The vehicle state recognition unit 31*e* recognizes the vehicle state of the target vehicle 2 based on the detection result of the internal sensor 23. The vehicle state may include the tire pressure. The vehicle state may include the wiper operation state and the lamp state or may include a failure state of the target vehicle 2. The autonomous driving ECU 30 does not necessarily have to have the vehicle state recognition unit 31*e*.

The trajectory generation unit 32 generates a trajectory used for the autonomous driving of the target vehicle 2. The trajectory generation unit 32 generates a trajectory for the autonomous driving based on a preset travel route, the map information, the position of the target vehicle 2 on the map, the external environment of the target vehicle 2, and the traveling state of the target vehicle 2.

The travel route is a route on which the target vehicle 2 travels in the autonomous driving. The trajectory generation unit 32 obtains the travel route for the autonomous driving based on, for example, a destination, the map information, and the position of the target vehicle 2 on the map. The travel route may be set by a well-known navigation system. The destination may be set by the passenger of the target vehicle 2 or may be automatically proposed by the autonomous driving ECU 30 or the navigation system.

The trajectory includes a path on which the vehicle travels in the autonomous driving and a vehicle speed profile in the autonomous driving. The path is a trajectory on which the vehicle being autonomously driven is scheduled to travel on the travel route. The path may be, for example, data (steering angle profile) of a change in the steering angle of the target vehicle 2 according to a position on the travel route. The position on the travel route is, for example, a set longitudinal position set for each predetermined spacing (for example, 1 m) in an advancing direction on the travel route. The steering angle profile is data in which a target steering angle is associated with each set longitudinal position.

The trajectory generation unit 32 generates the path on which the vehicle travels based on, for example, the travel route, the map information, the external environment of the target vehicle 2, and the traveling state of the target vehicle 2. The trajectory generation unit 32 generates the path such that, for example, the target vehicle 2 passes through a center of the lane included in the travel route (center in the lane width direction).

Instead of the steering angle profile, a steering torque profile in which a target steering torque is associated with each set longitudinal position may be used. Further, instead of the steering angle profile, a lateral position profile in which a target lateral position is associated with each set longitudinal position may be used. The target lateral position is a target position in a width direction of the lane. In this case, the set longitudinal position and the target lateral position may be set together as one position coordinate.

The vehicle speed profile is, for example, data in which a target vehicle speed is associated with each set longitudinal position. The set longitudinal position may be set with a traveling time of the vehicle instead of a distance as a reference. The set longitudinal position may be set as a reaching position of the vehicle after one second and a reaching position of the vehicle after two seconds.

The trajectory generation unit 32 generates the vehicle speed profile based on, for example, speed-related information such as a legal speed included in the path and map information. Instead of the legal speed, a set speed set in advance for a position or section on the map may be used. The trajectory generation unit 32 generates the trajectory for the autonomous driving from the path and the vehicle speed profile. A method of generating the trajectory in the trajectory generation unit 32 is not limited to the above contents, and another well-known method may be employed.

The autonomous driving controller 33 executes the autonomous driving of the target vehicle 2. The autonomous driving controller 33 executes the autonomous driving of the target vehicle 2 based on, for example, the external environment of the target vehicle 2, the traveling state of the target vehicle 2, and the trajectory generated by the trajectory generation unit 32. The autonomous driving controller 33 transmits the control signal to the actuator 28 to perform the autonomous driving of the target vehicle 2.

The assistance unit 34 assists the driving (traveling) of the target vehicle 2. For example, the assistance unit 34 may control the traveling state of the target vehicle 2 or may present various pieces of information to the driver of the target vehicle 2 using the HMI 27, as the driving assistance for the target vehicle 2. Details of the driving assistance provided by the assistance unit 34 will be described below.

Configuration of Information Processing Server

Figure 4:
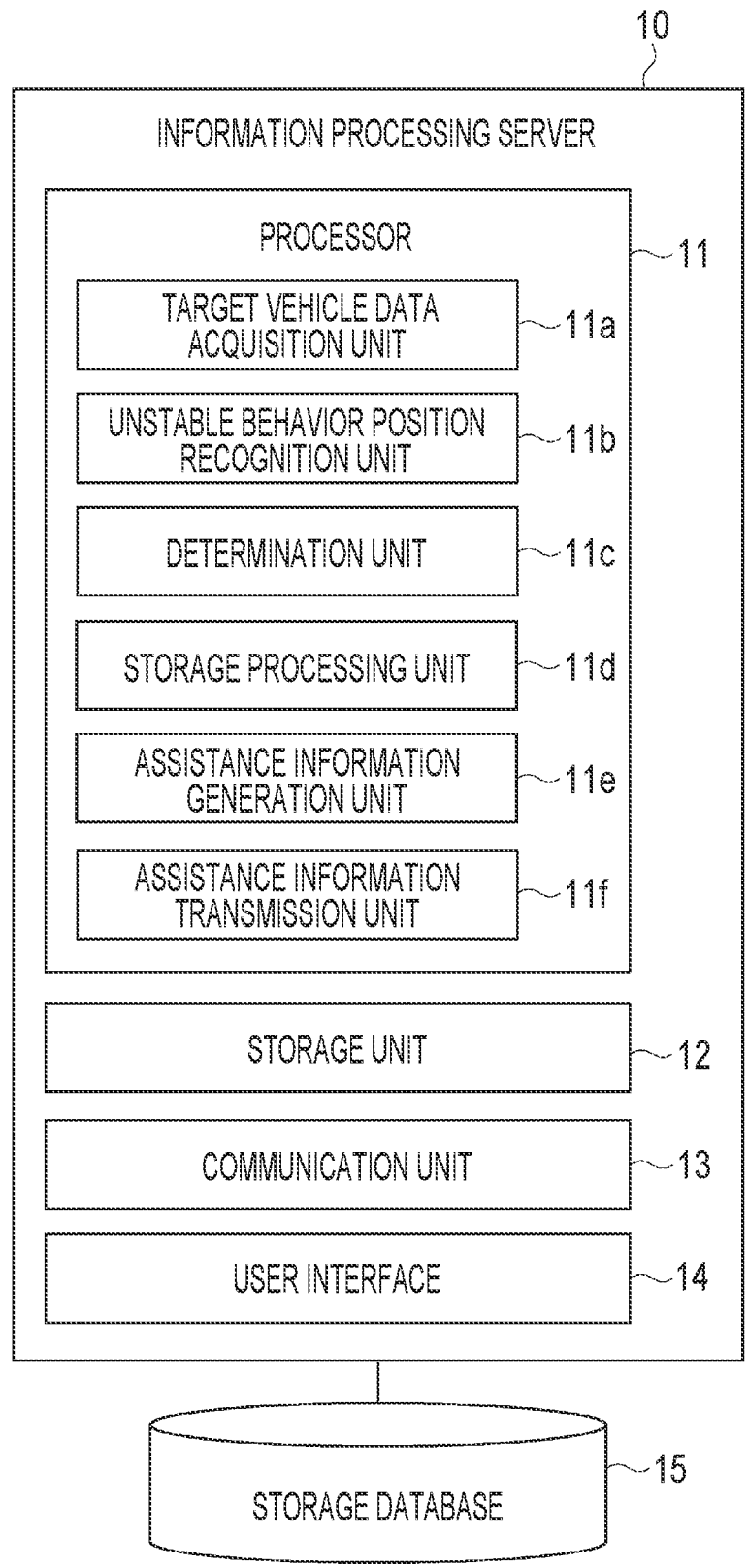
FIG. 4 is a block diagram showing an example of a configuration of an information processing server.

The information processing server 10 is provided in a facility such as an information management center and is configured to be able to communicate with the target vehicle 2. FIG. 4 is a block diagram showing an example of a configuration of the information processing server 10. The information processing server 10 shown in FIG. 4 is configured as a general computer including a processor 11, a storage unit 12, a communication unit 13, and a user interface 14.

The processor 11 operates, for example, an operating system to control the information processing server 10. The processor 11 is a calculator such as a central processing unit [CPU] including a control device, a calculation device, a register, and the like. The processor 11 manages the storage unit 12, the communication unit 13, and the user interface 14. The storage unit 12 is configured to include at least one of a memory or a storage. The memory is a recording medium, such as a read only memory [ROM] and a random access memory [RAM]. The storage is a recording medium, such as a hard disk drive [HDD].

The communication unit 13 is a communication device that performs communication via the network N. A network device, a network controller, a network card, or the like may be used for the communication unit 13. The user interface 14 is a device including an output device such as a display and a speaker and an input device such as a touch panel. The information processing server 10 does not necessarily have to be installed in the facility and may be mounted on a moving body such as a vehicle or a ship.

The information processing server 10 is connected to the storage database 15. The storage database 15 is a database that stores unstable behavior position information and the like. The storage database 15 may have the same configuration as a well-known database of the HDD. The storage database 15 may be provided in a facility or the like away from the information processing server 10.

Next, a functional configuration of the processor 11 will be described. As shown in FIG. 4, the processor 11 includes a target vehicle data acquisition unit (acquisition unit) 11a, an unstable behavior position recognition unit 11b, a determination unit 11c, a storage processing unit 11d, an assistance information generation unit 11e, and an assistance information transmission unit 11f.

The target vehicle data acquisition unit 11a acquires the target vehicle data transmitted from the target vehicle 2 via the communication unit 13. The target vehicle data includes the position information of the target vehicle 2 on the map and the traveling state of the target vehicle 2. The target vehicle data may include the external environment of the target vehicle 2 or may include the route on which the target vehicle 2 travels.

The unstable behavior position recognition unit 11b recognizes the unstable behavior position, which is a position on the map in which the unstable behavior occurs in the target vehicle 2, based on the target vehicle data acquired by the target vehicle data acquisition unit 11a. The unstable behavior is behavior of the vehicle that makes the traveling of the vehicle unstable. The unstable behavior includes, for example, slip. The unstable behavior may include sudden deceleration or a sudden steering angle change. The unstable behavior may include a lane deviation of the target vehicle 2 or may include an excessive approach of the target vehicle 2 to an object.

First, determination of the unstable behavior will be described. The unstable behavior position recognition unit 11b determines whether or not the unstable behavior occurs in the target vehicle 2 based on the target vehicle data. The unstable behavior position recognition unit 11b determines, for example, that the target vehicle 2 slips as the unstable behavior based on at least one of the acceleration detected by the acceleration sensor (front-rear acceleration and lateral acceleration), the wheel speed of each wheel detected by the wheel speed sensor, the yaw rate detected by the yaw rate sensor, the driver's steering angle detected by the steering sensor, the driver's brake operation amount detected by the brake sensor, or the brake pressure of the brake pressure sensor. Instead of the brake operation amount of the brake sensor, the master cylinder pressure of the hydraulic braking system may be used.

The unstable behavior position recognition unit 11b may use an operation start condition of a well-known antilock brake system [ABS] as the slip determination. For example, the antilock braking system is operated when a wheel considered to be locked is specified by comparing the wheel speed of each wheel with an estimated vehicle body speed, as an example. The estimated vehicle body speed may be obtained from the wheel speed of each wheel until the slip or may be obtained from a change in the acceleration until the slip.

The unstable behavior position recognition unit 11b may use, as the slip determination, an operation start condition of a well-known vehicle stability control system [VSC] or an operation start condition of a well-known traction control system [TRC]. The traction control system can also be operated when a slipping wheel is specified by comparing the wheel speed of each wheel with the estimated vehicle body speed. The unstable behavior position recognition unit 11b may determine the slip of the target vehicle 2 by another well-known method.

The unstable behavior position recognition unit 11b may determine whether or not the target vehicle 2 is suddenly decelerated as the unstable behavior based on the deceleration detected by the acceleration sensor. In this case, the unstable behavior position recognition unit 11b determines that the target vehicle 2 is suddenly decelerated, for example, when an absolute value of the deceleration becomes equal to or larger than a sudden deceleration threshold value. The sudden deceleration threshold value is a threshold value of a preset value. Hereinafter, the threshold value used in the description means the threshold value of the preset value.

The unstable behavior position recognition unit 11b may determine whether or not the sudden steering angle change occurs in the target vehicle 2 as the unstable behavior, based on the yaw rate detected by the yaw rate sensor. In this case, the unstable behavior position recognition unit 11b determines that the sudden steering angle change occurs in the target vehicle 2, for example, when the yaw rate becomes equal to or larger than a steering angle change threshold value. A tire turning angle may be used instead of the yaw rate.

The unstable behavior position recognition unit 11b may determine, when the direction indicator is not lit, whether or not the target vehicle 2 deviates from the lane as the unstable behavior based on the lateral position of the target vehicle 2 or the external environment of the target vehicle 2. In this case, the unstable behavior position recognition unit 11b determines, for example, the lane deviation from the lateral position of the target vehicle 2. Alternatively, the unstable behavior position recognition unit 11b may determine, when recognition is made that the target vehicle 2 straddles the lane dividing line, the lane deviation from the external environment of the target vehicle 2.

The unstable behavior position recognition unit 11b may determine whether or not the target vehicle 2 excessively approaches an object (for example, a front vehicle) as the unstable behavior based on the traveling state of the target vehicle 2 and the external environment of the target vehicle 2. In this case, the unstable behavior position recognition unit 11b may determine that the target vehicle 2 excessively approaches the object when the vehicle speed of the target vehicle 2 is equal to or larger than a vehicle speed threshold value and a time to collision [TTC] between the target vehicle 2 and the object becomes equal to or less than a TTC threshold value, from a fact that the behavior is not unstable even when a spacing from the object is small when the target vehicle 2 is at low speed. Instead of the time to collision, time headway [THW] or a distance may be used.

The determination as to whether or not the unstable behavior occurs in the target vehicle 2 may be performed every time the target vehicle data is acquired or may be collectively performed for each constant time or constant period. There may be an aspect in which the determination as to whether or not the unstable behavior occurs in the target vehicle 2 is performed while the target vehicle 2 is stopped.

Next, recognition of the unstable behavior position will be described. The unstable behavior position is a position of the target vehicle 2 on the map when the unstable behavior occurs in the target vehicle 2. The unstable behavior position recognition unit 11b recognizes the unstable behavior position when determination is made that the unstable behavior occurs in the target vehicle 2.

The unstable behavior position recognition unit 11b recognizes the unstable behavior position based on the position information of the target vehicle 2 on the map when determination is made that the unstable behavior occurs in the target vehicle 2. The unstable behavior position is recognized separately for each lane. When the unstable behavior is the lane deviation, the unstable behavior position may be a position on the traveling lane before the lane deviation or may be a position on the dividing line.

The unstable behavior position may be recognized as a section or an area instead of a point on the map. When the target vehicle 2 slides while slipping, the unstable behavior position recognition unit 11b may set a start position of the slip as the unstable behavior position or may recognize the entire section where the target vehicle 2 moves in a state where determination is made that the target vehicle 2 slips as the unstable behavior position. The area may be a range within a certain distance centered on the slipped target vehicle 2 or may be a region or zone in which the target vehicle 2 travels. The same applies to another piece of unstable behavior.

The determination unit 11c determines whether the unstable behavior position is a continuous occurrence situation or a discontinuous situation based on presence or absence of the unstable behavior in the target vehicles 2 at the unstable behavior position recognized by the unstable behavior position recognition unit 11b.

The determination unit 11c determines whether or not the target vehicle 2 has passed the unstable behavior position based on, for example, the target vehicle data acquired by the target vehicle data acquisition unit 11a and the unstable behavior position recognized by the unstable behavior position recognition unit 11b. The determination unit 11c determines, when determination is made that the target vehicle 2 has passed the unstable behavior position, whether the unstable behavior position is the continuous occurrence situation or the discontinuous situation based on presence or absence of the unstable behavior in the target vehicle 2. The determination unit 11c may collectively process a plurality of target vehicle data for each constant period to perform the above determination.

The continuous occurrence situation is a situation in which the unstable behavior continuously occurs. In the case of continuous occurrence situation, it can be considered that the unstable behavior is less likely to occur due to an individual vehicle factor of the target vehicle 2 and the unstable behavior is more likely to occur due to an external factor such as a road environment. The discontinuous situation is a situation that is not the continuous occurrence situation. In the case of discontinuous situation, it can be considered that the unstable behavior is more likely to occur due to the individual vehicle factor of the target vehicle 2. The determination unit 11c determines, when determination is not made that the unstable behavior position is the continuous occurrence situation, that the unstable behavior position is the discontinuous situation.

FIG. 5A is a diagram for describing an example of the continuous occurrence situation. As shown in FIG. 5A, as an example, when the unstable behavior occurs continuously in the two target vehicles 2A and 2B at the unstable behavior position D, the determination unit 11c determines that the continuous occurrence situation occurs at the unstable behavior position. FIG. 5B is a diagram for describing an example of the discontinuous situation. When the following target vehicle 2B passes through the unstable behavior position D without causing the unstable behavior even though the unstable behavior occurs in the target vehicle 2A at the unstable behavior position D, the determination unit 11c may determine that the discontinuous situation occurs at the unstable behavior position.

The situation determined to be the continuous occurrence situation is not limited to the situation shown in FIG. 5A. When the unstable behavior occurs continuously in the three target vehicles 2A to 2C, the determination unit 11c may determine that the continuous occurrence situation occurs at the unstable behavior position D. When the unstable behavior occurs continuously in four or more target vehicles 2, the determination unit 11c may determine that the continuous occurrence situation occurs at the unstable behavior position D. When the unstable behavior occurs in all the target vehicles 2 passing through the unstable behavior position D within a constant time, the determination unit 11c may determine that the continuous occurrence situation occurs at the unstable behavior position D.

Even though there is one target vehicle 2 for which the unstable behavior does not occur, the determination unit 11c may determine that the continuous occurrence situation occurs at the unstable behavior position D when the unstable behavior occurs in the target vehicles 2 in front of and at the rear of the one target vehicle 2. Specifically, even though the target vehicle 2B in the middle of the three target vehicles 2A to 2C has passed the unstable behavior position D without causing the unstable behavior, the determination unit 11c may determine that the continuous occurrence situation occurs at the unstable behavior position D when the unstable behavior occurs in the target vehicle 2A and the target vehicle 2C. Alternatively, even though there are a plurality of target vehicles 2 for which the unstable behavior does not occur, the determination unit 11c may determine that the continuous occurrence situation occurs at the unstable behavior position D when the number of target vehicles 2 for which the unstable behavior does not occur within a constant time is equal to or larger than a threshold value.

Figures 6A, 6B:
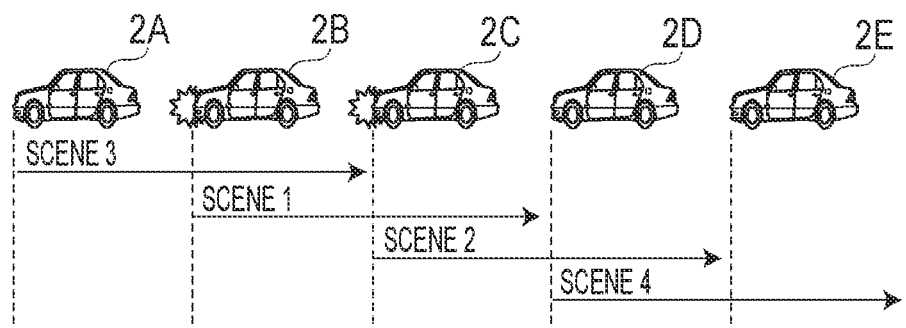
FIG. 6A is a table for describing an example of a scene classification of unstable behavior.
FIG. 6B is a diagram for describing the example of the scene classification of the unstable behavior.

The determination unit 11c may determine the continuous occurrence situation and the discontinuous situation by a finer classification. FIG. 6A is a table for describing an example of a scene classification of the unstable behavior. As shown in FIG. 6A, focusing on a preceding target vehicle 2 and a following target vehicle 2 with respect to the unstable behavior position, four scenes can be classified by presence or absence of the unstable behavior.

In FIG. 6A, a scene 1 is a case where the unstable behavior occurs in both the preceding target vehicle 2 and the following target vehicle 2, a scene 2 is a case where the unstable behavior occurs in solely the preceding target vehicle 2, a scene 3 is a case where the unstable behavior occurs in solely the following target vehicle 2, and a scene 4 is a case where the unstable behavior does not occur in both the preceding target vehicle 2 and the following target vehicle 2. For example, the scene 1 corresponds to the continuous occurrence situation, and the scenes 2 to 4 correspond to the discontinuous situation.

FIG. 6B is a diagram for describing the example of the scene classification of the unstable behavior. The target vehicles 2A to 2F are assumed to have passed the same unstable behavior position in this order. In FIG. 6B, among the target vehicles 2A to 2E, the unstable behavior occurs in solely the target vehicle 2B and the target vehicle 2C, and the remaining vehicles pass through the unstable behavior position without causing the unstable behavior.

Focusing on the target vehicle 2A and the target vehicle 2B in FIG. 6B, the case corresponds to the scene 3 in which the unstable behavior occurs in solely the following target vehicle 2B. Focusing on the target vehicle 2B and the target vehicle 2C, the case corresponds to the scene 1 in which the unstable behavior occurs in both the preceding target vehicle 2B and the following target vehicle 2C. Focusing on the target vehicle 2C and the target vehicle 2D, the case corresponds to the scene 2 in which the unstable behavior occurs in solely the preceding target vehicle 2C. Focusing on the target vehicle 2D and the target vehicle 2E, the case corresponds to the scene 4 in which the unstable behavior does not occur in any of the target vehicles 2. In this manner, the determination unit 11c may make the determination to classify the scenes 1 to 4.

The storage processing unit 11d stores the target vehicle data acquired by the target vehicle data acquisition unit 11a in the storage database 15. Further, the storage processing unit 11d stores the unstable behavior position information regarding the unstable behavior position recognized by the unstable behavior position recognition unit 11b in the storage database 15. When the determination unit 11c makes the determination, the storage processing unit 11d stores the unstable behavior position in the storage database 15 in relation to the determination result of the determination unit 11c.

The storage processing unit 11d stores the assistance information generated by the assistance information generation unit 11e based on the target vehicle data in the storage database 15 in association with an area where the assistance information is generated.

The assistance information generation unit 11e generates the assistance information for suppressing the unstable behavior of the target vehicle 2, which is a driving assistance target. The assistance information generation unit 11e performs, for example, statistical processing on the plurality of target vehicle data acquired by the target vehicle data acquisition unit 11a to generate the assistance information. The assistance information generation unit 11e uses the target vehicle data stored in the storage database 15 as the target vehicle data acquired by the target vehicle data acquisition unit 11a.

The assistance information generation unit 11e generates, for example, the assistance information in a predetermined area based on the plurality of target vehicle data in the predetermined area. The predetermined area here may be an area having a predetermined size or a predetermined point. The assistance information generation unit 11e can generate the assistance information that captures a tendency of the unstable behavior in the predetermined area based on the traveling state of the target vehicle 2 included in the target vehicle data.

In the present embodiment, the assistance information generation unit 11e generates information regarding the tendency of the unstable behavior in the predetermined area as the assistance information. For example, the assistance information generation unit 11e generates, as the assistance information, information on a point where slip is likely to occur, information on a point where a state in which the target vehicle unnecessarily approaches a surrounding object such as a front vehicle is likely to occur (collision avoidance assistance information), and the like.

The assistance information generation unit 11e can generate information contents of the assistance information based on the unstable behavior determined by the unstable behavior position recognition unit 11b. The assistance information generation unit 11e can generate the information contents of the assistance information by excluding the unstable behavior determined by the determination unit 11c to be the discontinuous situation. In this case, the assistance information generation unit 11e can generate more appropriate information contents by excluding the unstable behavior caused by the individual vehicle factor of the target vehicle 2.

The assistance information generation unit 11e generates reliability of each piece of assistance information together with the assistance information. For example, the assistance information generation unit 11e may generate the reliability of the assistance information based on a percentage where a situation of the assistance information (for example, slip) transmitted from the information processing server 10 to the target vehicle 2 actually occurs (conformity rate for the transmitted assistance information). The assistance information generation unit 11e can determine whether or not the situation of the assistance information actually occurs based on, for example, the target vehicle data acquired by the target vehicle data acquisition unit 11a.

As another example of calculating the reliability, the assistance information generation unit 11e may generate the reliability based on a probability that a situation of generating the assistance information, such as the slip, occurs at a predetermined point (a percentage of the target vehicle that has slipped or the like among the target vehicles 2 passing through the predetermined point).

The assistance information generation unit 11e stores the generated assistance information in the storage database 15 in association with the reliability of the assistance information.

The assistance information transmission unit 11f transmits the assistance information generated by the assistance information generation unit 11e and the reliability of the assistance information to the target vehicle 2 subjected to the driving assistance. As described above, the assistance information generation unit 11e generates the assistance information for each predetermined area. The assistance information transmission unit 11f determines the target vehicle 2 facing the predetermined area where the assistance information is generated. When there is a target vehicle 2 heading for the predetermined area, the assistance information transmission unit 11f can determine the target vehicle 2 as the target vehicle 2 subjected to the driving assistance.

Details of Driving Assistance

Figure 7:
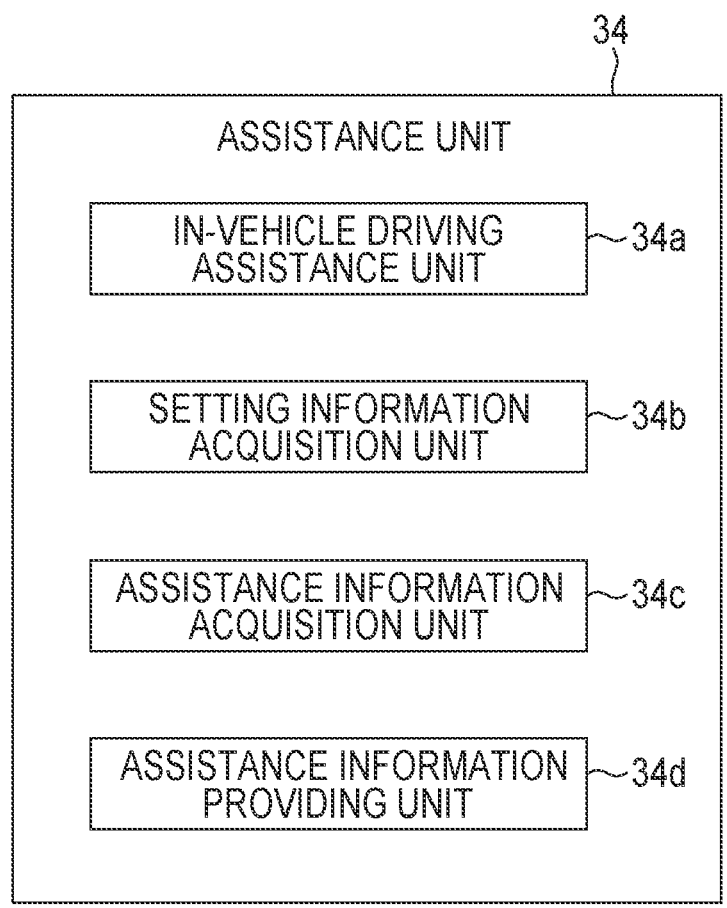
FIG. 7 is a block diagram showing details of an assistance unit mounted on a target vehicle.

Next, details of the driving assistance provided by the assistance unit 34 (refer to FIG. 3) of the target vehicle 2 will be described. The assistance unit 34 can provide the driving assistance based on the detection result of a surrounding situation of the target vehicle 2 or the like and the driving assistance based on the assistance information transmitted from the information processing server 10. As shown in FIG. 7, the assistance unit 34 functionally includes an in-vehicle driving assistance unit (in-vehicle driving assistance device) 34*a*, a setting information acquisition unit 34*b*, an assistance information acquisition unit 34*c*, and an assistance information providing unit (driving assistance unit) 34*d*.

The in-vehicle driving assistance unit 34*a* provides the driving assistance for the target vehicle 2. For example, the in-vehicle driving assistance unit 34*a* provides the driving assistance based on the detection results of various sensors and the like mounted on the target vehicle 2. That is, the target vehicle 2 is a vehicle equipped with the in-vehicle driving assistance unit 34*a* as the in-vehicle driving assistance device. For example, the in-vehicle driving assistance unit 34*a* provides the collision avoidance assistance (pre-crash safety function) to prevent the target vehicle 2 from unnecessarily approaching the front vehicle. In this case, the in-vehicle driving assistance unit 34*a* issues a warning when the target vehicle 2 approaches the front vehicle (surrounding vehicle) by a warning threshold value or more as the collision avoidance assistance. Further, the in-vehicle driving assistance unit 34*a* may operate the brake of the target vehicle 2 when the target vehicle 2 approaches the front vehicle by a predetermined brake start threshold value or more.

The driver of the target vehicle 2 can set an assistance timing of the driving assistance provided by the in-vehicle driving assistance unit 34*a*. The set assistance timing is stored in, for example, the in-vehicle driving assistance unit 34*a*. This assistance timing is, for example, a timing of starting the execution of assistance. In the present embodiment, the assistance timing can be an output timing of the warning in the collision avoidance assistance. The driver of the target vehicle 2 presets, for example, "early", "intermediate", and "late" as the output timing of the warning in the collision avoidance assistance.

The setting information acquisition unit 34*b* acquires the assistance timing of the in-vehicle driving assistance unit 34*a* set by the driver of the target vehicle 2. The setting information acquisition unit 34*b* acquires the output timing of the warning in the collision avoidance assistance of the in-vehicle driving assistance unit 34*a* set by the driver.

The assistance information acquisition unit 34*c* acquires the assistance information transmitted by the assistance information transmission unit 11*f* of the information processing server 10 and the reliability of the assistance information via the communication unit 26.

The assistance information providing unit 34*d* provides the driving assistance for the target vehicle 2 based on the assistance information acquired by the assistance information acquisition unit 34*c*. The assistance information providing unit 34*d* provides the driving assistance based on the assistance information, based on the assistance timing acquired by the setting information acquisition unit 34*b*. When the assistance timing is within a first timing range, the assistance information providing unit 34*d* provides the driving assistance for the target vehicle 2 based on the acquired assistance information. On the other hand, when the acquired assistance timing is within a second timing range later than the first timing range, the assistance information providing unit 34*d* does not execute the driving assistance for the target vehicle 2 based on the acquired assistance information. That is, the assistance information providing unit 34*d* does not execute the driving assistance when the assistance timing is late. The first timing range may be, for example, a case where the output timing of the warning set by the driver in the collision avoidance assistance is "early" and "intermediate". The second timing range may be a case where the output timing of the warning set by the driver in the collision avoidance assistance is "late".

Here, it can be said that the assistance timing set by the driver reflects a driver's intention as to whether or not the driving assistance is easily accepted. For example, when the assistance timing is early, it can be said that the driver tends to easily accept the driving assistance. On the contrary, when the assistance timing is late, it can be said that the driver tends to hardly accept the driving assistance. In this manner, the assistance information providing unit 34*d* executes the driving assistance based on the assistance information acquired from the information processing server 10 by using the assistance timing set by the driver as the driver's intention for the driving assistance. The assistance information providing unit 34*d* considers, when the assistance timing is late, that the driver tends to hardly accept the driving assistance (that is, intention to consider the driving assistance to be troublesome) and does not execute the driving assistance.

Further, the assistance information providing unit 34*d* provides the driving assistance based on the reliability of the assistance information acquired by the assistance information acquisition unit 34*c*. More specifically, when the acquired reliability of the assistance information is higher than a predetermined reliability threshold value, the assistance information providing unit 34*d* executes the driving assistance based on the assistance information even though the assistance timing is in the second timing range. That is, even when the driving assistance is not executed since the assistance timing is late, the assistance information providing unit 34*d* executes the driving assistance when the reliability is high.

In the present embodiment, the assistance information providing unit 34*d* issues the warning for alerting the driver of the target vehicle 2 based on the acquired assistance information as the driving assistance. For example, the assistance information providing unit 34*d* can issue the warning using the HMI 27.

For example, when the acquired assistance information is information related to the collision avoidance assistance, a warning indicating that there is an area where the target vehicle easily approaches the front vehicle is issued. When the acquired assistance information is information related to the collision avoidance assistance, the assistance information providing unit 34*d* issues a warning based on the assistance information acquired from the information processing server 10 before the warning of the collision avoidance assistance by the in-vehicle driving assistance unit 34*a*.

Accordingly, the assistance unit 34 can issue the warning at an early stage based on the assistance information of the collision avoidance assistance transmitted from the information processing server 10 before the external sensor 22 or the like of the target vehicle 2 detects the approach to the front vehicle. When the warning of the collision avoidance assistance based on the assistance information acquired from the information processing server 10 is issued, the in-vehicle driving assistance unit 34*a* does not have to issue the collision avoidance assistance warning again. In addition to the collision avoidance assistance warning described above, the assistance information providing unit 34*d* issues a warning regarding the slip based on the assistance timing and the reliability when the acquired assistance information is information related to the slip, for example.

Driving Assistance Process

Figure 8:
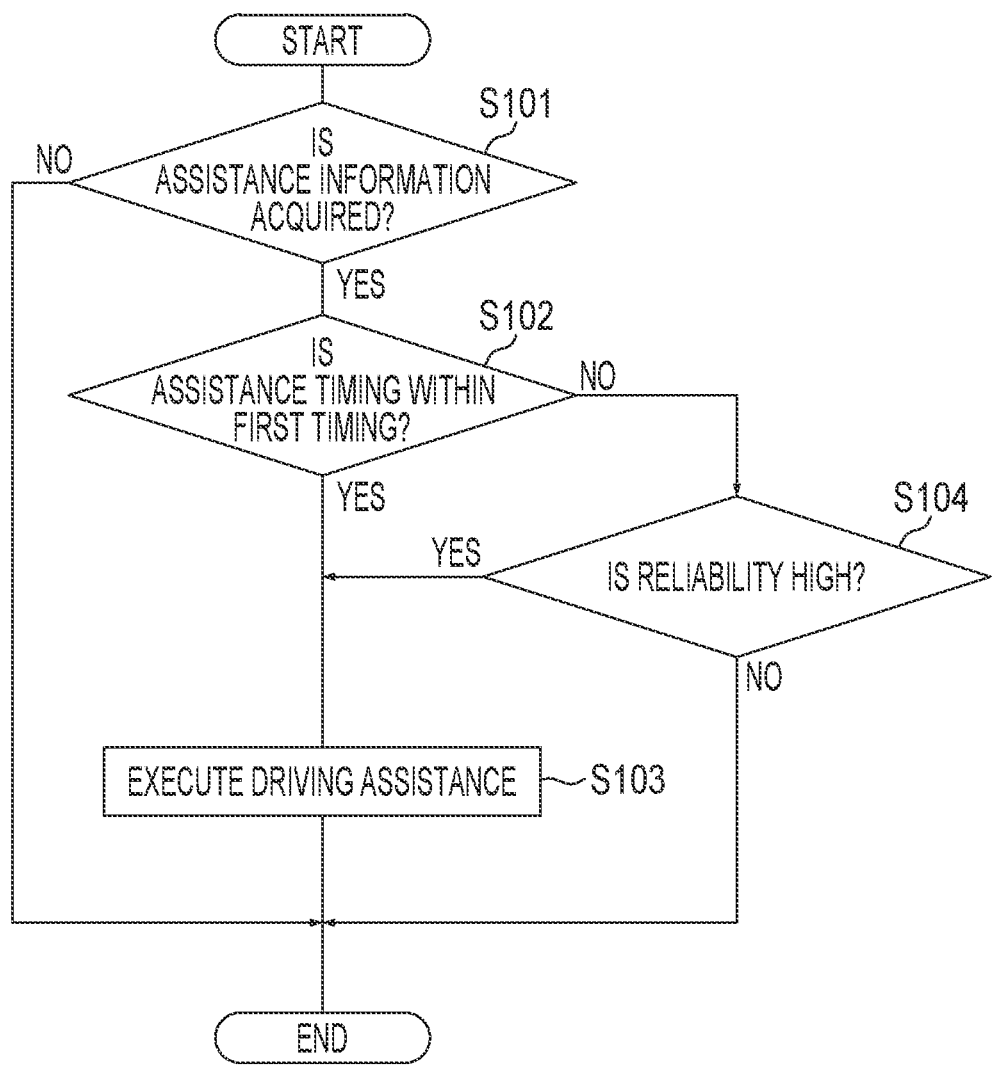
FIG. 8 is a flowchart showing a flow of a driving assistance process performed based on assistance information transmitted from the information processing server.

Next, a flow of a driving assistance process (driving assistance method) performed by the assistance unit 34 based on the assistance information acquired from the information processing server 10 will be described. The driving assistance process shown in FIG. 8 is started, for example, when the target vehicle 2 is in a travelable state. In the process shown in FIG. 8, when the process reaches the end, the process is started again from the start after a predetermined time.

As shown in FIG. 8, the assistance information acquisition unit 34c determines whether or not the assistance information transmitted from the information processing server 10 is acquired (S101: assistance information acquisition step). When the assistance information cannot be acquired (S101: NO), the assistance information acquisition unit 34c performs the process of S101 again after a predetermined time. On the other hand, when the assistance information is acquired (S101: YES), the setting information acquisition unit 34b acquires the assistance timing set by the driver and determines whether or not the acquired assistance timing is within the first timing range (S102: setting information acquisition step).

When the assistance timing is within the first timing range (S102: YES), the assistance information providing unit 34d provides the driving assistance (for example, warning in the present embodiment) for the target vehicle 2 based on the assistance information acquired from the information processing server 10 (S103: driving assistance step).

On the other hand, when the assistance timing is not within the first timing range (S102: NO), the assistance information providing unit 34d determines whether or not the reliability acquired together with the assistance information in S101 is higher than the predetermined reliability threshold value (S104). When the reliability is higher than the reliability threshold (S104: YES), the assistance information providing unit 34d performs the process of S103. On the other hand, when the reliability is not higher than the reliability threshold value (S104: NO), the assistance unit 34 restarts the process from S101 after a predetermined time.

Driving Assistance Program

A driving assistance program causes the autonomous driving ECU 30 of the target vehicle 2 to function (operate) as the setting information acquisition unit 34b, the assistance information acquisition unit 34c, and the assistance information providing unit 34d described above. The driving assistance program is provided by a non-transitory recording medium, such as a ROM or a semiconductor memory. Further, the driving assistance program may be provided via communication, such as a network.

As described above, with the driving assistance system 1 (driving assistance method and driving assistance program), the driving assistance based on the assistance information generated by the information processing server 10 is provided based on the assistance timing of the assistance unit 34 set by the driver. The case where the assistance timing set by the driver is late is considered to be a case where the driver does not want active driving assistance. Therefore, in this driving assistance system 1 (driving assistance method and driving assistance program), the driving assistance based on the assistance information generated by the information processing server 10 is not provided when the assistance timing is late (when the assistance timing is within the second timing range). That is, this driving assistance system 1 (driving assistance method and driving assistance program) can read the driver's intention for the driving assistance based on the assistance timing of the in-vehicle driving assistance device set by the driver. Accordingly, the driving assistance system 1 (driving assistance method and driving assistance program) can provide the driving assistance in consideration of the driver's intention.

The in-vehicle driving assistance unit 34a provides the collision avoidance assistance as the driving assistance and issues the warning, as the collision avoidance assistance, when the vehicle approaches the front vehicle. When the driving assistance based on the assistance information acquired from the information processing server 10 is provided, the assistance information providing unit 34d issues the warning based on the assistance information before the collision avoidance assistance warning by the in-vehicle driving assistance unit 34a. In this case, the driving assistance system 1 (driving assistance method and assistance program) can issue the warning based on the assistance information acquired from the information processing server 10 at an early stage according to the driver's intention before the collision avoidance warning by the in-vehicle driving assistance unit 34a.

When the reliability of the acquired assistance information is higher than the reliability threshold value, the assistance information providing unit 34d executes the driving assistance based on the assistance information even though the assistance timing is in the second timing range. In this case, the driving assistance system 1 (driving assistance method and assistance program) can execute the driving assistance based on the assistance information regardless of the driver's intention when the reliability of the assistance information is high.

Although the embodiments of the present disclosure have been described above, the present disclosure is not limited to the above embodiments. For example, the setting information acquisition unit 34b is not limited to using the warning output timing in the collision avoidance assistance as the assistance timing of the in-vehicle driving assistance unit 34a set by the driver of the target vehicle 2. For example, the setting information acquisition unit 34b may use, as the assistance timing set by the driver, a set value of an inter-vehicle distance in inter-vehicle distance control (auto cruise control) performed by the in-vehicle driving assistance unit 34a as the driving assistance. In the inter-vehicle distance control, when a distance between an own vehicle and the front vehicle is shorter than the set value (when the vehicle is too close to the front vehicle), vehicle drive or braking is controlled such that the distance is equal to or larger than the set value (the vehicle is away from the front vehicle). In this case, for example, it is considered that the driver tends to easily accept the driving assistance since the assistance timing is early when the set value of the inter-vehicle distance is long and the driver tends to hardly accept the driving assistance since the assistance timing is late when the set value of the inter-vehicle distance is short. For this reason, there may be a configuration in which the assistance information providing unit 34d considers that the driver tends to hardly accept the driving assistance when the inter-vehicle distance is short (that is, tends to consider the driving assistance to be troublesome), similarly to the assistance timing of the collision avoidance assistance, and does not execute the driving assistance.

When the driving assistance is provided based on the assistance information acquired by the assistance information acquisition unit 34c, the assistance information providing unit 34d may issue, to the driver, the alert that the set value of the inter-vehicle distance is requested to be widened. Alternatively, the assistance information providing unit 34d may provide the in-vehicle driving assistance unit 34a with information that the set value of the inter-vehicle distance is requested to be widened. In this case, the in-vehicle driving assistance unit 34a changes the set value of the inter-vehicle distance to be larger than the original value based on reception of the information that the set value of the inter-vehicle distance is requested to be widened.

Further, some of the functions of the information processing server 10 described above may be executed in the target vehicle 2, or some of the functions of the target vehicle 2 described above may be executed in the information processing server 10.

What is claimed is:

1. A driving assistance system that provides driving assistance for a vehicle equipped with an in-vehicle driving assistance device based on assistance information generated by an assistance information generation device, the system comprising:
    an assistance information acquisition unit configured to acquire the assistance information from the assistance information generation device;
    a setting information acquisition unit configured to acquire an assistance timing of the in-vehicle driving assistance device set by a driver of the vehicle; and
    a driving assistance unit configured to execute the driving assistance for the vehicle based on the acquired assistance information,
    wherein the driving assistance unit executes the driving assistance for the vehicle based on the acquired assistance information when the assistance timing is within a first timing range and does not execute the driving assistance for the vehicle based on the acquired assistance information when the assistance timing is within a second timing range later than the first timing range.

2. The driving assistance system according to claim 1, wherein:
    the in-vehicle driving assistance device provides collision avoidance assistance and issues a warning when the vehicle approaches a front vehicle as the collision avoidance assistance;
    the assistance timing is an output timing of the warning issued by the in-vehicle driving assistance device;
    the assistance information acquired by the assistance information acquisition unit is information related to the collision avoidance assistance; and
    the driving assistance unit issues, when the driving assistance based on the assistance information is executed, a warning based on the assistance information before the warning by the in-vehicle driving assistance device.

3. The driving assistance system according to claim 1, wherein:
    the assistance information acquisition unit acquires reliability of the assistance information together with the assistance information from the assistance information generation device; and
    the driving assistance unit executes, when the acquired reliability of the assistance information is higher than a predetermined reliability threshold value, the driving assistance based on the assistance information even though the assistance timing is in the second timing range.

4. A driving assistance method of providing driving assistance for a vehicle equipped with an in-vehicle driving assistance device based on assistance information generated by an assistance information generation device, the method comprising:
    an assistance information acquisition step of acquiring the assistance information from the assistance information generation device;
    a setting information acquisition step of acquiring an assistance timing of the in-vehicle driving assistance device set by a driver of the vehicle; and
    a driving assistance step of executing the driving assistance for the vehicle based on the acquired assistance information,
    wherein in the driving assistance step, the driving assistance for the vehicle is executed based on the acquired assistance information when the assistance timing is within a first timing range and the driving assistance for the vehicle based on the acquired assistance information is not executed when the assistance timing is within a second timing range later than the first timing range.

5. A non-transitory storage medium storing a driving assistance program that operates a driving assistance electronic control unit (ECU) of a driving assistance system that provides driving assistance for a vehicle equipped with an in-vehicle driving assistance device based on assistance information generated by an assistance information generation device, the program causing the driving assistance ECU to operate as:
    an assistance information acquisition unit configured to acquire the assistance information from the assistance information generation device;
    a setting information acquisition unit configured to acquire an assistance timing of the in-vehicle driving assistance device set by a driver of the vehicle; and
    a driving assistance unit configured to execute the driving assistance for the vehicle based on the acquired assistance information,
    wherein in the driving assistance unit, the driving assistance for the vehicle is executed based on the acquired assistance information when the assistance timing is within a first timing range and the driving assistance for the vehicle based on the acquired assistance information is not executed when the assistance timing is within a second timing range later than the first timing range.

6. The non-transitory storage medium according to claim 5, wherein:
    the in-vehicle driving assistance device provides collision avoidance assistance and issues a warning when the vehicle approaches a front vehicle as the collision avoidance assistance;
    the assistance timing is an output timing of the warning issued by the in-vehicle driving assistance device;
    the assistance information acquired by the assistance information acquisition unit is information related to the collision avoidance assistance; and
    the driving assistance unit issues, when the driving assistance based on the assistance information is executed, a warning based on the assistance information before the warning by the in-vehicle driving assistance device.

7. The non-transitory storage medium according to claim 5, wherein:
    the assistance information acquisition unit acquires reliability of the assistance information together with the assistance information from the assistance information generation device; and
    the driving assistance unit executes, when the acquired reliability of the assistance information is higher than a predetermined reliability threshold value, the driving assistance based on the assistance information even though the assistance timing is in the second timing range.

* * * * *